United States Patent Office 3,534,122
Patented Oct. 13, 1970

3,534,122
FREE RADICAL POLYMERIZATION OF BULK LIQUID ACRYLIC MONOMER WITH MONO-TERTIARY BUTYL PEROXY MALEIC ACID AND TERTIARY PHOSPHINE COAGENT AT ROOM TEMPERATURE
John A. Cornell, Philadelphia, Pa., assignor to Sartomer Resins, Inc., Essington, Pa., a corporation of Pennsylvania
No Drawing. Filed Mar. 10, 1967, Ser. No. 622,040
Int. Cl. C08f 15/18
U.S. Cl. 260—885
4 Claims

ABSTRACT OF THE DISCLOSURE

Room temperature polymerization of liquid acrylic syrups such as methyl methacrylate, ethyl acrylate or the like with tertiary phosphine in amounts of 0.1%–2.0% by weight of the liquid acrylic monomer and from about 0.15% to about 0.5% by weight of mono-tertiary butyl peroxy maleic acid can occur in the presence of small amounts of water by a free radical mechanism to produce bubble-free solid products of high clarity, high transparency and minimum discoloration, the surface hardness of the solid product being above 35 units on the Rockwell M scale and the products being resistant to discoloration by ultraviolet light. Inclusion of up to 1.0% of azo isobutyryl nitrile in the monomer adapts the solid polymer resulting from room temperature initiation to be postcured at temperatures of 80–110° C. for a period of ½ to 2 hours.

---

The present invention relates to a method for free radical polymerization of liquid monomeric acrylate and methacrylate esters of monohydric and polyhydric alcohols at room temperature in the presence of trialkyl phosphine, triaryl phosphine or trialkaryl phosphine promoter as a coagent for mono-tertiary butyl peroxy permaleate which is dispersed in the liquid ester as the sole free radical source in critical amounts of from about 0.15% to about 0.5% by weight of the monomer ester which is polymerized while the phosphine coagent is present in critical amounts of about 0.1% to about 2.0% by weight of the liquid ester monomer. It is preferable that from 0.75% to 1.5% by weight of phosphine coagent be mixed with the liquid ester monomer in the presence of 0.25% of mono-tertiary butyl peroxy maleate in order to trigger immediate polymerization at room temperature (15–30° C.). The phosphine promoted mono-tertiary permaleate polymerization takes place surprisingly rapidly at room temperature, e.g. 15–30° C., in low viscosity liquids or in thickened syrups consisting essentially of liquid methacrylate or acrylate esters or mixtures of these which have been thickened with acrylic or vinyl polymers such as are widely used in dentistry. The low viscosity liquid may be the pure monomer per se or the monomer dissolved in inert organic volatile solvent. The presence of small amounts of water, e.g. 0.1%–0.6% by weight of the liquid acrylic ester monomer, does not slow the rapid polymerization at room temperature. It may also be desirable to add from 0.2% up to 1.0% of an azo catalyst, such as azo isobutyryl nitrile, without either increasing or decreasing the cure rate at room temperature. This azo catalyst may be used for a final cure for a time of ½ to 2 hours at higher temperatures of 80–110° C. after room temperature polymerization has been completed and this type of post-curing is known in the prior art of denture manufacture where benzoyl peroxide catalyst has been employed. Only the azo free radical generating catalysts equivalent to azo isobutyryl nitrile are effective in post-curing. Benzoyl peroxide, for example, is not effective and, indeed, inhibits the room temperature cure when present in the same proportions as the azo catalyst at room temperature initiation.

It is known to polymerize certain highly polar acrylic compounds, such as acrylonitrile, in cationic polymerization employing triethyl phosphine as catalyst at temperatures of reaction of minus 30° C. in inert solvent to recover relatively low molecular weight homopolymer of acrylonitrile (relative viscosity of about 1.07 up to about 3.48, as 1.0% solution in dimethyl formamide) and this method is taught in Jurgeleit U.S. Pat. No. 3,027,359, granted Mar. 27, 1962. Jurgeleit shows that more than 0.1% of water in the medium prevents any polymerization (see Pat. No. 3,027,359, column 1, lines 45–50). Jurgeleit believes this polymerization to be ionic. Water in such amounts does not retard the present polymerization. In addition, the ability to copolymerize methyl methacrylate and styrene in essentially 50/50 molar compositions is generally accepted as a further proof of free radical polymerization.

The polymerizable acrylic esters are known to be inhibited against polymerization at room temperature by trialkyl phosphine, trialkaryl phosphine or triaryl phosphine, as shown in Lal U.S. Pat. No. 2,833,741, if the phosphine is employed as the sole agent. Also, Lal shows that polymerization in the presence of peroxide and phosphine does not occur at room temperature but requires elevated temperatures of 60° C. in a sealed tube for a long time period of about 8 hours. Note that Example 1 in Lal employs 0.5% benzoyl peroxide in the presence of .015% of triphenyl phosphine at 60° C. In the absence of this phosphine additive, the same sample polymerized in 4 hours, e.g. in ½ the time.

As shown at page 56 of Schildknecht "Polymer Processes," Interscience Publishers Ltd. (1956), the manufacture of methyl methacrylate polymer sheets of high clarity and surface perfection represents one of the principal uses of acrylic casting syrups and the usual commercial method requires a high degree of skill in carrying out the polymerization process in an autoclave above atmospheric pressure so that bubble-formation can be avoided, the atmospheric pressure being 100 pounds p.s.i. or higher. Heat treatment of the cured sheets at 140° C. has been required to relieve strains and remove monomer. Repair of these sheets, either during their fabrication into complicated shapes such as a commercial sign or an aircraft bubble or later in service, has been unsatisfactory. Either the repair must be made in a shop where heat and pressure are available or a product susceptible to discoloration on aging or exposure to ultraviolet light must be used.

Constant improvements have been required to meet the need for high clarity, bubble-free sheeting for architectural and aircraft glazing. Casting syrups used for forming and repairing cast or molded objects which are supplied by commercial suppliers have shown continuous improvement, but the present invention carries this improvement forward still further by eliminating bubbles, discoloration under sunlight and the like to achieve through a unique catalyst system effective at room temperature, adequate initial hardness values of about 35 Rockwell M units. This is accomplished through employment of a tertiary phosphine and mono-tertiary butyl peroxy maleic acid in limited proportions.

In an effort to increase the rate of polymerization at room temperature while avoiding the disadvantages of poor color which is the main defect in amine-promoted room temperature polymerizing systems, an extensive investigation was carried out by applicant to more completely elucidate the retarding effect of tertiary phosphine taught by Lal for use as inhibitor with the common peroxide initiators.

Lal's observations for benzoyl peroxide were confirmed and similar retardation of the polymerization rate was experimentally verified for lauroyl peroxide, 2,4-dichloro benzoyl peroxide, acetyl peroxide, succinic acid peroxide, tertiary butyl peroxy octoate, p-chloro benzoyl peroxide, tertiary butyl peroxy isobutyrate, tertiary butyl perbenzoate, tertiary butyl peroxide, methyl ethyl ketone peroxide, tertiary butyl perphthalic acid and tertiary butyl succinic acid. In each of these cases, polymerization was slower in the presence of the phosphine used with each of the above-named peroxides other than mono-tertiary butyl ester of peroxy maleic acid than when the peroxide was used alone and the combination required a minimum critical temperature for initiation of about 60° C.

It was surprising to discover that mono-tertiary butyl ester of peroxy maleic acid is unique in reducing the temperature of initiation in bulk polymerization of liquid acrylic ester to room temperature when employed with tertiary phosphine coagent in critical amounts of from 0.5% to about 2.0% by weight of the liquid ester being polymerized. It was also surprising to find that the phosphine coagent permitted solidification to occur at room temperature in the short time of from 3–6 minutes, depending on the relative proportions of phosphine coagent to peroxide and to monomer and the proportions of the thickening agent which is dissolved in the syrup and which tends to speed the reaction.

Generally, the optimum proportions of the unique peroxy maleate for a typical methacrylate ester, such as methyl methacrylate (which at room temperature equilibrium contains less than about 0.4% water), is about 0.15% to about 0.3% by weight of the monomer; and the most effective proportions of phosphine coagent for this peroxide dosage are from about 0.75% to about 1.5%. This combination of active ingredients produces bubble-free, color-free brilliantly transparent solid polymerized products at ambient room temperature (generally about 20–30° C.) in less than 30 minutes, the molecular weight of the product being in the range of about 150,000 to about 350,000. The acrylate monomer is conveniently stabilized with the phosphine compound prior to polymerization instead of using hydroquinone, pyrogallol, phenothiozine, copper salts or the like, and thereby contributes to the quality, hardness, purity and transparency of the solid product polymerized at room temperature. The proper selection of the phosphine also imparts ultraviolet screening, thermal stabilization and flame-resistance to the solid product.

The preferred tertiary phosphine coagents are the triaryl phosphines and trialkaryl phosphines, such as triphenyl phosphine, tritolyl phosphine, tri-(p-methoxy phenyl) phosphine, tri-(p-ethoxy phenyl) phosphine, tri-(ortho-ethoxy tolyl) phosphine and homologues thereof, but the trialkyl phosphines and the trialkoxy phosphines may also be used although they are not as effective in the same concentration in initiating polymerization at room temperature as the peroxy maleate catalyst. Unsymmetrical triaryl phosphines may be used but are more expensive.

Generally, all of the trivalent hydrocarbon-substituted phosphines disclosed at column 1 in Lal U.S. Pat. No. 2,833,741 may be used, but for reasons of economy and reproducibility, the phosphines having three identical aryl or alkaryl R groups, e.g. phenyl, ortho-tolyl, p-tolyl, p-methoxy phenyl, ortho-ethoxy phenyl and the like, are preferred.

In the following examples which illustrate the invention, all parts and percentages are in parts by weight, except as otherwise specified.

EXAMPLE 1

A dental dough composition was prepared by mixing two parts by weight of methyl methacrylate bead polymer of average particle diameter of between 0.15 and 0.23 millimeter and in proportion of fine-to-coarse as shown in the table at column 6 of Cornell et al. U.S. Pat. No. 2,947,716, the beads having residual benzoyl peroxide in the amount of 0.02% to 0.08%, preferably below 0.06%. To these beads was added 0.25% of tertiary butyl peroxy maleic acid dissolved in petroleum ether and surface-occluded to the beads by milling and evaporating the solvent. To two parts of these surface-occluded beads was added one part of methyl methacrylate monomer containing 1.0% triphenyl phosphine as the sole additional ingredient. The paste thus formed was mixed at 25° C. and was formed in a dental mold. This paste composition in the mold was polymerized at the ambient temperature of 25° C. to a hard cured, transparent, solid plastic having an initial Rockwell M hardness of 35 units after 26 minutes. The molecular weight of the polymerized composition was 250,000 as determined by the relative viscosity test carried out at 25° C. in ethylene dichloride as the solvent. The transparent plastic was completely free from porosity. One-half of the sample was subjected to the effect of heat and ultraviolet light according to ASTM D620–49 for 24 and 72 hours. This exposed half was compared with the unexposed half. No color change was observed and transparency was maintained.

In contrast, a test was carried out with a composition in accordance with Example 1 of Du Pont U.S. Pat. No. 3,234,194, and 0.13% of triethylamine was used as promoter for the same mono-tertiary butyl peroxy maleate. After two weeks of exposure to sunlight, the sample based on the amine promoter was very yellow and had a value of 6 on an arbitrary 1–10 scale, while the sample of the present invention in the same test had a value of about 1. Other amines tested by the two-week exposure to sunlight showed ratings of 10 for morpholine and 10 for tetrakis(N-N-dimethylamino)-ethylene on the same arbitrary scale.

The long-working copolymer of ethyl acrylate and methyl methacrylate, as taught in Example 1 of Cornell et al. U.S. Pat. No. 2,947,716, may be used to replace up to 30% of the bead polymer used in the solid phase to achieve long-working characteristics.

EXAMPLE 2

The process of Example 1 was followed with the following substitution made for the methyl methacrylate polymer beads constituting the solid phase of the dough system. 50% by weight of the beads consisted of polymethyl methacrylate homopolymer of molecular weight of 500,000. The beads were in the same sieve size as set out in Example 1. A high quality dental dough polymerized in the mold in about 30 minutes at room temperature and the hardness value was substantially the same as in Example 1. Anhydrous methyl monomer containing less than 0.01% gave better products than the monomer containing 0.1%, the latter tending to turn hazy on storage in humid atmosphere for 90 day periods.

EXAMPLE 3

A dental dough was made in accordance with Example 1 except that the liquid methyl methacrylate monomer contained 20 parts of ethylene glycol dimethacrylate per 100 parts of polymerizable liquid monomer. A satisfactory high quality solid transparent product was made at room temperature in about 30 minutes. Similar results were achieved when 20 parts of triethylene glycol dimethacrylate were used and when 20 parts of tetraethylene glycol dimethacrylate were used instead of the ethylene glycol dimethacrylate, polymerization being completed in about 30 minutes. The last two cross-linked solid polymers were more impact-resistant than the first (the ethylene glycol dimethacrylate cross-linked polymer). Also, a mixture of 8% divinyl benzene and 92% methyl methacrylate monomer constituting the liquid phase produced a hard, transparent, solid product which was harder than the ethylene glycol dimethacrylate product herein.

EXAMPLE 4

A dental dough was made in accordance with Example 2, except that triethylene glycol dimethacrylate monomer was used as the sole polymerizable monomer containing 1.0% triphenyl phosphine and a slight excess of monomer was used. The dough formed by this mixture polymerized in 5 minutes to a hard infusible polymer in which no bubbles were present and which did not discolor under ultraviolet light (SI lamp for 72 hours).

EXAMPLE 5

The following example illustrates the dough technique which originated in dental technology applied for the manufacture of an impact-resistant, red-dyed, transparent cover for an automobile stoplight. The dye which was employed in this example was Sudan Red MR which is a red dye soluble in liquid acrylic monomers and useful for matching the standard red tail light color. The stoplight was molded on a plaster of paris form utilizing the same proportions of monomer to bead polymer as set out in Example 1 herein. The bead polymer was the same polymethyl methacrylate homopolymer in the same sieve size as in Example 1. The monomer phase consisted of 70% of trimethylol propane triacrylate and 30% of dibutyl phthalate. The liquid phase contained 1.0% of triphenyl phosphine and the beads were milled to occlude 0.2% of monotertiary butyl peroxy maleic acid. In addition, 0.5% azo isobutyryl nitrile was also added as a powder and milled onto the surface of the beads. The paste, to which 0.1% of the dye was added, was formed at 28° C. in the mold. A satisfactory impact-resistant, dyed, transparent product was thus produced. This product can be modified to lower the transparency and reduce the glare by incorporating fillers, such as titanium dioxide, iron oxide, calcium carbonate and the like.

Other plasticizers which may be used instead of dibutyl phthalate include di-(2-ethylhexyl) phthalate, dioctyl adipate, dioctyl sebacate, methyl phthalate glycolate and equivalent water-insoluble ester plasticizers of low volatility. It may be desirable to add ultraviolet stabilizers, such as methacrylate-substituted benzophenone, available as "Permasorb MA" from National Starch Company, and hydroxy phenyl benzotriazole, available from Geigy under the names "Tinuvin 326" and "Tinuvin 327." Triphenyl phosphine itself acts as a very satisfactory ultraviolet screening agent as shown in Murry U.S. Pat. No. 1,969,473 for cellulose acetate. Similar ultraviolet absorption occurred with the methacrylate polymers.

EXAMPLE 6

This example illustrates a two-step method of manufacturing a syrup consisting essentially of methyl methacrylate which is adapted to polymerize at room temperature in accordance with the invention. In the first step, a sample of pure methyl methacrylate monomer which had been freed of hydroquinone stabilizer was polymerized thermally in the absence of catalyst at a temperature of 95° C. with constant agitation until, based upon the consistency of the syrup, about 20% of polymerized methyl methacrylate solid was dissolved in the syrup. The induction period was shortened by dropping a few beads of polymethyl methacrylate into the pure liquid methyl methacrylate monomer prior to the initial heating step. Special precautions were taken to prevent bubbles from being stirred into the syrup. The desired concentration of methyl methacrylate solid was achieved in about 12 hours of heating. To this syrup in a test tube, cooled to 25° C., was added 1.0% of triphenyl phosphine and 0.2% of mono-tertiary butyl peroxy maleic acid. The temperature was monitored and in 18 minutes a heat peak of 68° C. was recorded in a ⅜″ section of methyl methacrylate in the test tube.

In another test tube, the same amount of liquid syrup to which only peroxy maleic acid had been added was monitored for temperature change and the recording device showed no temperature change for 24 hours.

Similarly, another test tube containing only triphenyl phosphine as the additive in the same concentration as in the first test tube was monitored for temperature change and no change was observed for a 24 hour period.

In the foregoing examples, the acrylic ester monomers provide the best results if free from inhibitors or impurities such as water.

In accordance with the above illustrative examples, it can be seen that a polymerizable composition which will produce more transparent products can be obtained in the presence of the usual bifunctional cross-linking agents, e.g. diacrylates, divinyl benzene or allyl methacrylate, and improved pigmented or transparent dyed products can be made from the commercially available acrylic monomers. If such polymerizable acrylic compositions, prior to polymerization, are required to be stored for extended periods, the addition of the tertiary phosphine coagents permits long storage without polymerization and at the same time permits the advantages of direct polymerization at room temperature without the added step of removal of any of the inhibitor therefrom, and produces more transparent, bubble-free products by adding critical amounts of mono-tertiary butyl peroxy maleic acid.

Because of this adventage, the polymerizable compositions have particular utility in the fabrication of dental restorations or in the repair of cast or molded optical components, or for aircraft closures, etc. for which transparency is important.

The term "consisting essentially of," as used in the definition of the ingredients present in the composition claim, is intended to exclude the presence of other materials in such amounts as to interfere substantially with the properties set forth, but to permit the presence of other materials in such amounts as not to substantially affect the properties and characteristics adversely therein.

I claim:
1. A method for free radical polymerization of thickened liquid monomeric acrylate and methacrylate esters of monohydric and polyhydric alcohols containing, as thickening agent, a solid polymer selected from the group consisting of polymethylmethacrylate, methylmethacrylate copolymerized with from 2–10% of allyl methacrylate, methylmethacrylate copolymerized with from 3–10% of ethylacrylate, methylmethacrylate copolymerized with from 5–30% of ethylene glycol dimethacrylate, methylmethacrylate copolymerized with from 5–95% of triethylene glycol dimethacrylate, and polymerized tetraethylene glycol dimethacrylate, the polymerization being carried out at ambient temperatures of from 15–30° C. to produce a bubble-free, hard, solid product of high clarity, and high transparency which is resistant to discoloration by ultraviolet light, the method consisting essentially of dispersing a tertiary organo-phosphine selected from the group consisting of trialkyl phosphine, trialkaryl phosphine and triaryl phosphine in an amount of from about 0.5% to about 2.0% by weight of the liquid acrylate being polymerized and adding from about 0.15% to about 0.5% by weight of the monomer ester of mono-tertiary butyl peroxy maleate as the sole source of peroxide in the liquid monomer phase for polymerization at room temperature.

2. A polymerized composition of matter consisting essentially of an acrylate solid polymer made by bulk polymerization of liquid monomeric acrylate and methacrylate esters of monohydric and polyhydric alcohols thickened with a solid polymer selected from the group consisting of polymethyl methacrylate, methylmethacrylate copolymerized with from 2–10% of allyl methacrylate, methylmethacrylate copolymerized with from 3–10% of ethylacrylate, methyl methacrylate copolymerized with from 5–30% of ethylene glycol dimethacrylate, methyl methacrylate copolymerized with from 5–95% of triethylene glycol dimethacrylate, and polymerized tetraethylene glycol dimethacrylate, the polymerization being initiated in the monomer of the acrylate at 15–30° C. by from 0.5% to about 2.0% of tertiary phosphine selected from the group consisting of trialkyl phosphine, trialkaryl phosphine, and triaryl phosphine, and from 0.15% to 0.5% of mono-tertiary butyl peroxy maleate as the effective peroxide for room temperature initiation, said monomer containing up to about 1.0% by weight thereof of azo isobutyryl nitrile which adapts the solid polymer initiated at room temperature to be post-cured at temperatures of 80–110° C. for a period of from ½ to 2 hours to provide a bubble-free, hard, solid product of high clarity and high transparency which is resistant to discoloration by ultraviolet light.

3. A method as claimed in claim 1, wherein the liquid acrylate ester contains up to about 8% of divinyl benzene, based upon the weight of the liquid monomer, as a cross-linking agent.

4. A composition as claimed in claim 2, wherein the liquid acrylate ester contains up to about 8% of divinyl benzene, based upon the weight of the liquid monomer, as a cross-linking agent.

References Cited

UNITED STATES PATENTS

| | | | |
|---|---|---|---|
| 2,468,094 | 4/1949 | Marks | 260—88.5 |
| 2,543,635 | 2/1951 | Loritsch | 260—89.5 |
| 2,833,741 | 5/1958 | Lal | 260—89.5 |
| 3,234,194 | 2/1966 | Slocum | 260—89.5 |
| 3,362,942 | 1/1968 | Munn | 260—89.5 |
| 3,414,547 | 12/1968 | Thompson et al. | 260—78.5 |
| 3,487,062 | 12/1969 | Bodycot. | |

FOREIGN PATENTS

| | | |
|---|---|---|
| 938,068 | 9/1963 | Great Britain. |
| 1,002,669 | 8/1965 | Great Britain. |
| 703,377 | 2/1965 | Canada. |
| 1,086,995 | 10/1967 | Great Britain. |

SAMUEL H. BLECH, Primary Examiner

R. J. SEIBERT, Assistant Examiner

U.S. Cl. X.R.

260—89.5, 610